(12) United States Patent
Haber et al.

(10) Patent No.: US 6,711,248 B1
(45) Date of Patent: Mar. 23, 2004

(54) MESSAGE CALLBACK FEATURE

(75) Inventors: Barry Haber, Westport, CT (US); Gerard A. Rutigliano, Somers, NY (US); Leandro P. Rizzuto, Sheridan, WY (US); Anthony Solomita, Norwalk, CT (US); Lisa Black, White Plains, NY (US); Robert Taylor, Clarksburg, NJ (US); Wing Nin Ng, Shatin (HK)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 09/376,851

(22) Filed: Aug. 18, 1999

(51) Int. Cl.$^7$ ............................................... H04M 3/42
(52) U.S. Cl. ............................ 379/210.01; 379/88.18; 379/88.19; 379/88.23
(58) Field of Search ............................ 379/88.18, 88.19, 379/88.23, 210.01

(56) References Cited

U.S. PATENT DOCUMENTS

| | | | |
|---|---|---|---|
| 4,481,382 A | 11/1984 | Villa-Real | |
| 4,873,719 A * | 10/1989 | Reese | 379/215 |
| 4,930,152 A | 5/1990 | Miller | |
| 4,985,913 A * | 1/1991 | Shalom | 379/76 |
| 5,090,051 A | 2/1992 | Muppidi et al. | |
| 5,181,236 A * | 1/1993 | LaVallee | 379/67 |
| 5,185,782 A | 2/1993 | Srinivasan | |
| 5,388,150 A * | 2/1995 | Schneyer et al. | 379/67 |
| 5,717,741 A * | 2/1998 | Yue | 379/67 |
| 5,832,060 A * | 11/1998 | Corlett | 379/88 |
| 5,850,435 A | 12/1998 | Devillier | |
| 6,009,158 A * | 12/1999 | Romero | 379/209 |
| 6,067,349 A * | 5/2000 | Suder | 379/88.19 |
| 6,195,418 B1 * | 2/2001 | Ridgley | 379/88.23 |
| 6,266,399 B1 * | 7/2001 | Weller | 379/88.19 |

* cited by examiner

Primary Examiner—Ahmad F. Matar
Assistant Examiner—Rasha S AL-Aubaldi
(74) Attorney, Agent, or Firm—Ohlandt, Greeley, Ruggiero & Perle, LLP

(57) ABSTRACT

The method of the invention enables an automatic callback to a calling telephone whose caller has left a recorded message. In response to a received call, an identifier of the calling telephone is stored along with the message from the caller. Thereafter, the called party is enabled to play the message left by the caller and is further enabled to enter a callback signal during the playing of the message. This action causes the message playback to be interrupted, the identifier to be recalled from memory and used to automatically place a call to the calling telephone whose message was interrupted.

12 Claims, 3 Drawing Sheets

MESSAGE CALLBACK FEATURE

FIELD OF THE INVENTION

This invention relates to telephones with answering machine capability and, more particularly, to such a telephone system having the capability of providing an automatic callback to a caller who leaves a recorded message.

BACKGROUND OF THE INVENTION

The provision of automatic callback arrangements is known in the prior art. U.S. Pat. No. 5,185,782 to Srinivasan describes a callback arrangement for an automatic call distribution system which collects and stores the telephone numbers from which calls are incoming, estimates how long each call will have to hold in a cue before being answered and, if the waiting time exceeds a predetermined maximum, prompts the caller to choose between holding or receiving a return call. If the caller chooses a return call, the system prompts the caller for a callback time and time period. Thereafter, the system places an outgoing call to the stored telephone number when the callback time arrives. This action is repeated, periodically, until the call is either answered or a callback time period expires.

U.S. Pat. No. 5,850,435 to Devillier describes a telephone system wherein a caller initiates a call to a subscriber and further provides an audible caller name to the subscriber. Upon hearing the caller's name, the subscriber may either accept the call or reject it. In one embodiment, the incoming call names are placed on a call list, with the subscriber being able to later access the call name list and to make the calls to telephone numbers corresponding to the names on the list.

U.S. Pat. No. 4,930,152 to Miller provides a telephone customer with access to a memorized list of calls which the customer had previously been unable to answer. When an incoming call is not answered, the caller's number is entered on the customer's callback list. The customer is later advised of the calling numbers and is then able to signal for automatic placement of a return call.

U.S. Pat. No. 4,481,382 to Villa-Real describes a telephone set which may be programmed with data corresponding to one or more telephone numbers to be called and the time and date at which such telephone calls are to be placed. The telephone includes an alarm which signals when one of the telephone numbers is to be called.

U.S. Pat. No. 5,090,051 to Muppidi et al. describes a system and method for connecting an incoming telephone call to a cordless telephone. When the incoming call is received, identifying information for the cordless telephone, along with the callback number, is transmitted using a paging signal. A base station that locates the cordless telephone by then calling a switch utilizing the callback identifier, the base station is able to complete the call.

In currently available telephone answering machines, provision is made to record a message from the incoming caller and for the called party to retrieve and listen to the message. When the telephone further includes caller identifier capabilities, the calling number can be displayed to the called party. If the called party wishes to return a call to the calling party, the called party is required to dial the displayed number after the message has been completed or stopped by the called party. Such action may result in an error being made in entering the calling number.

It is therefore an object of this invention to provide an improved telephone/answering machine system wherein a user is enabled to automatically return a call to a calling party without having to manually input the calling party's phone number.

SUMMARY OF THE INVENTION

The method of the invention enables an automatic callback to a calling telephone whose caller has left a recorded message. In response to a received call, an identifier of the calling telephone is stored along with the message from the caller. Thereafter, the called party is enabled to play the message left by the caller and is further enabled to enter a callback signal during the playing of the message. This action causes the message playback to be interrupted, the identifier to be recalled from memory and used to automatically place a call to the calling telephone whose message was interrupted.

DETAILED DESCRIPTION OF THE INVENTION

Figure 1:
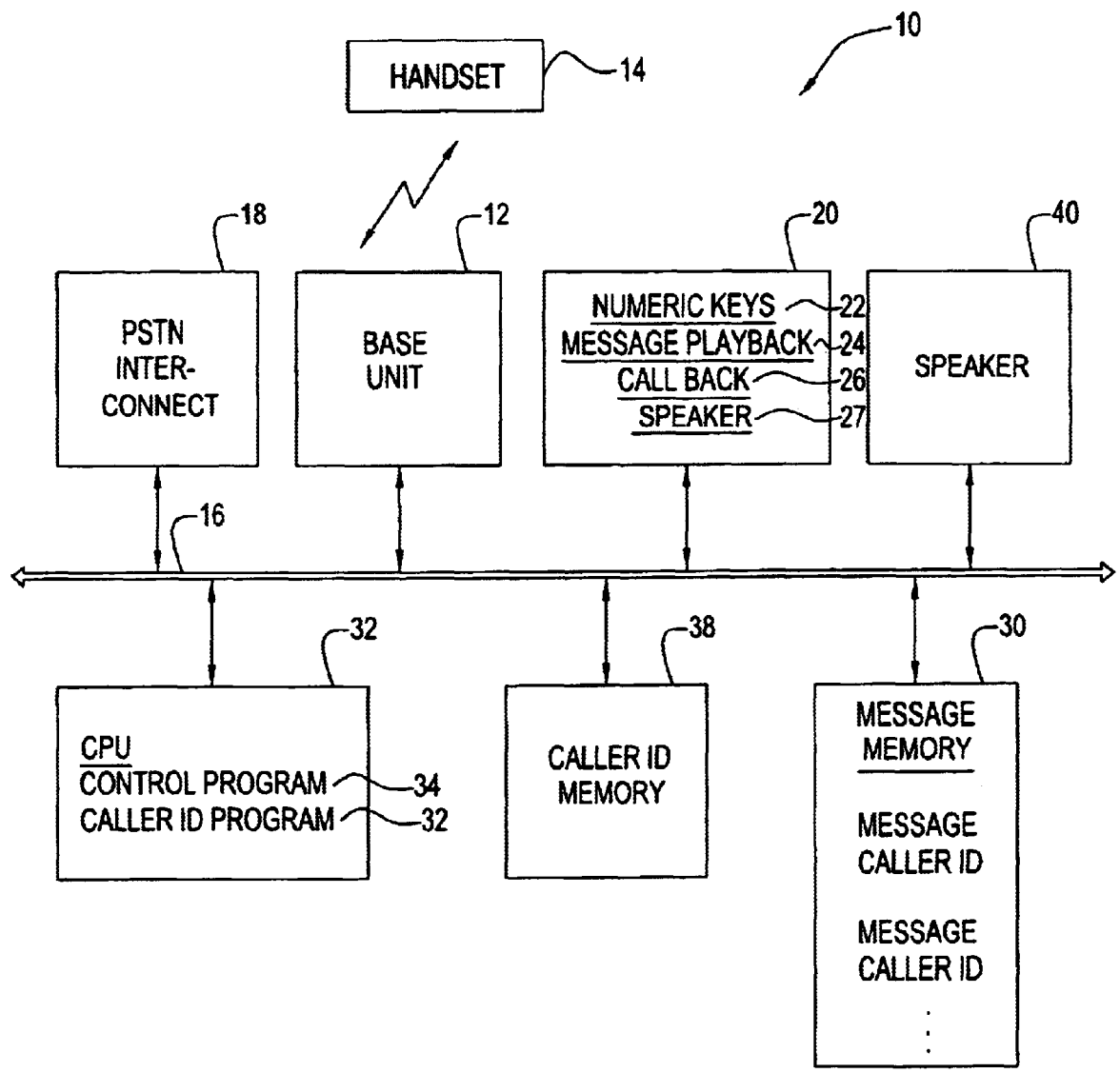
FIG. 1 is a block diagram of a system adapted to carry out the method of the invention.

Referring to FIG. 1, the invention will be described in the context of a cordless telephone system 10 that includes an integrated answering machine capability. Accordingly, telephone system 10 includes a telephone base unit 12 which communicates with a handset 14 in the known manner.

Base unit 12 is coupled via a bus system 16 to a public service telephone network interconnect 18. A control panel 20 includes a plurality of numeric keys 22, a message playback key 24, a callback key 26 and speaker key 27. Control panel 20 communicates with other elements of telephone system 10 via bus system 16.

A message memory 30 provides a storage region for messages left by incoming callers whose calls are not answered. Message memory 30 accordingly stores individual messages and, associated therewith, a caller identifier that denotes the telephone number of the caller leaving the message.

Central processing unit 32 controls the overall operation of telephone system 10 and includes a resident control program 34 and a caller ID procedure 36 that captures caller identifiers of incoming calls. Control program 34 is utilized by CPU 32 during operation of telephone system 10 to perform various control functions.

A caller ID memory 38 is used to store caller identifiers, separately from those stored in message memory 34 (for caller identification purposes). A speaker 40 is used to enable implementation of a "speakerphone" facility for telephone system 10.

Figure 2A:
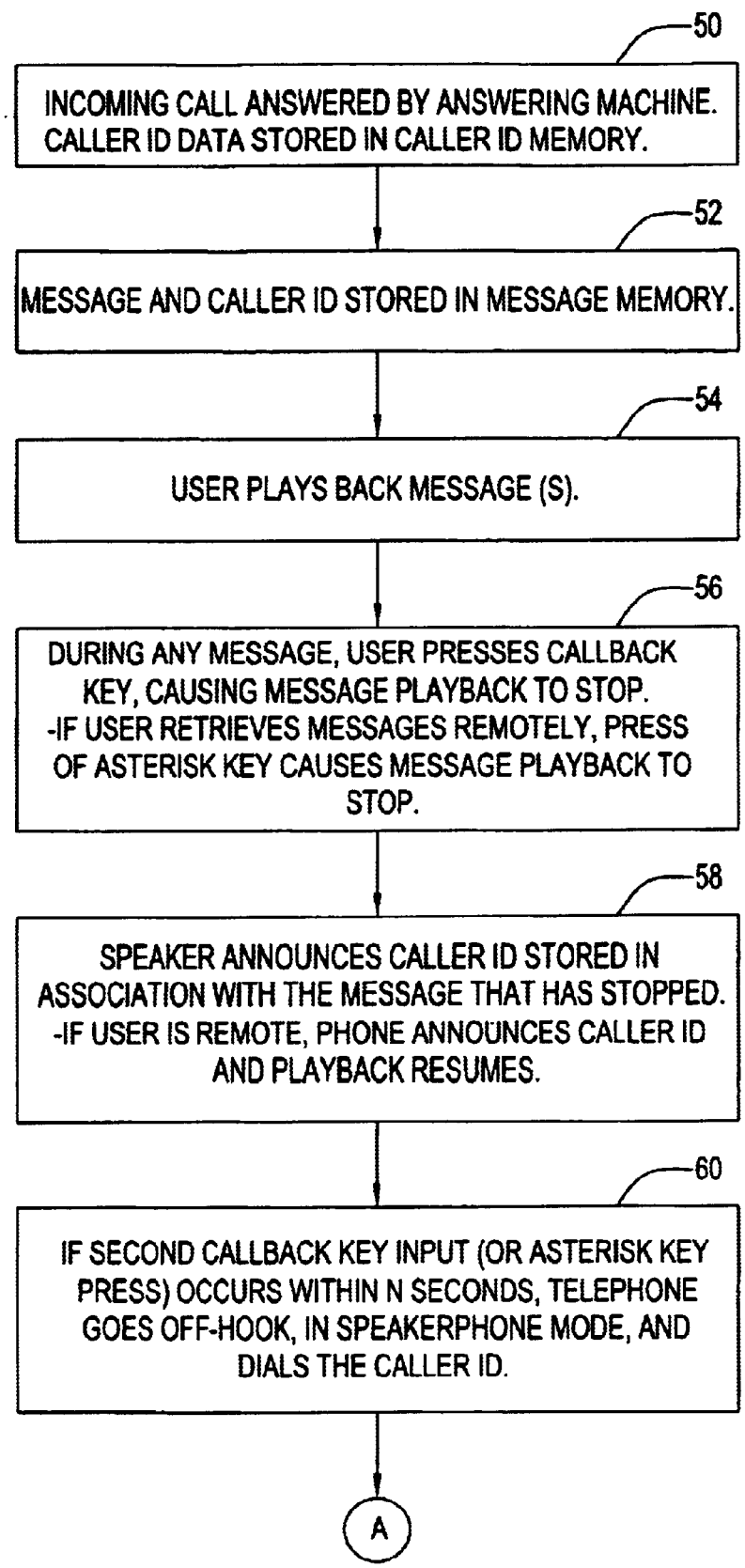
FIG. 2 is a logic flow diagram illustrating the method of the invention.
Figure 2B:
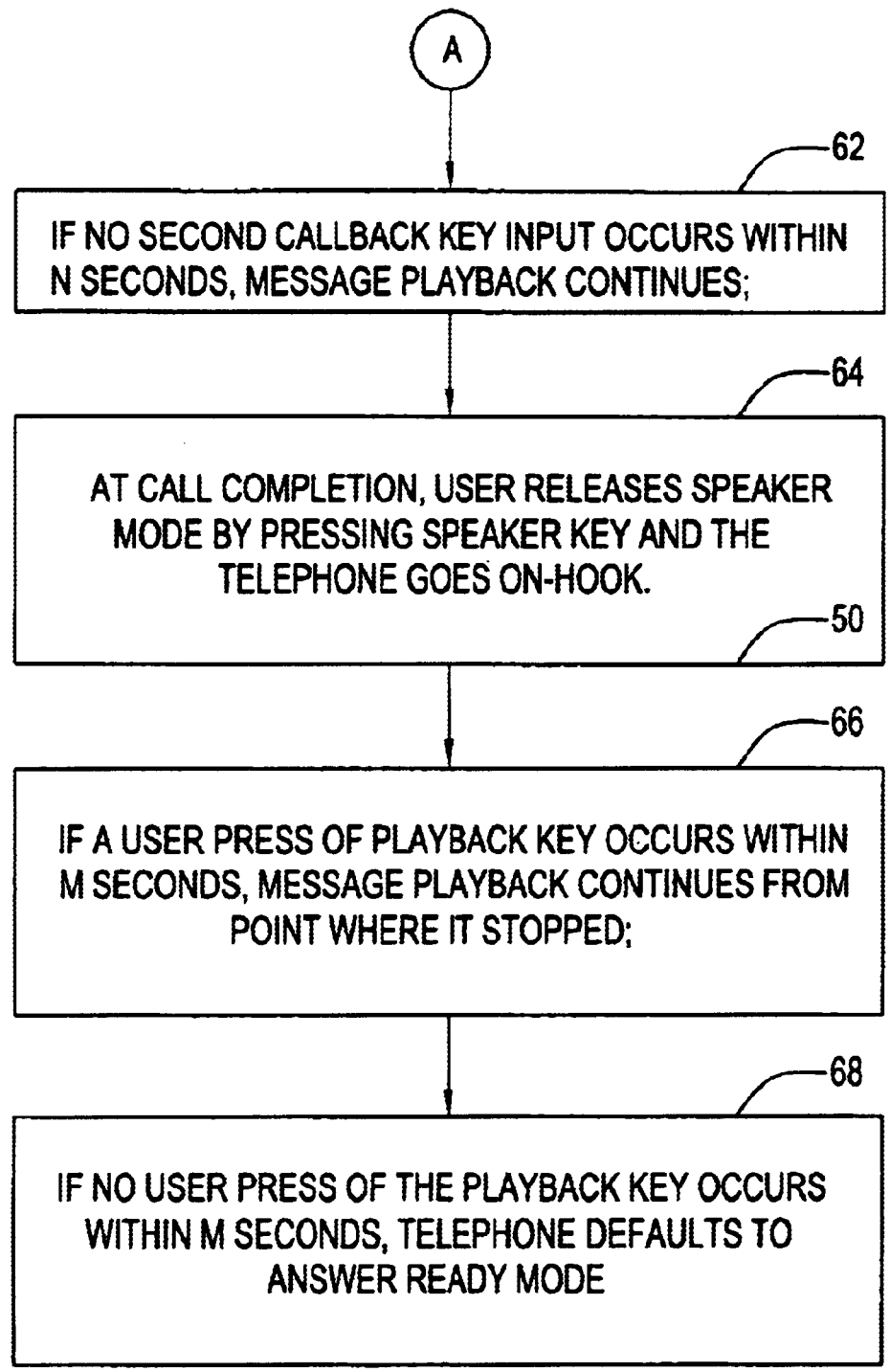

In order to understand the operation of the invention, reference will be made to FIGS. 2A and 2B which describe the method of the invention that is utilized by telephone system 10 to enable automatic callback to a caller who has left a message in message memory 30. Initially, an incoming call is answered by the answering machine facility under control of control program 34. Caller ID procedure causes the caller ID data to be stored in caller ID memory 38 (step 50).

Assuming that the call is not answered, control procedure 34 enables a message to be recorded from the caller into message memory 30 along with a copy of the caller ID (step 52). At some time thereafter, the user actuates message playback key 24, which actuation is sensed by control program 34, causing the messages in message memory 30 to be sequentially played (via speaker 40) for the user's review (step 54).

During any message playback, the user may press callback key 26. If such action occurs, control program 34 senses the actuation of callback key 26 and immediately stops playback of the current message (step 56). Then, control program 34 causes a message to be announced over speaker 40 indicating the caller ID that is associated with the message that has been stopped (step 58).

If the user still wishes to call the telephone number indicated by the caller ID, the user again presses callback key 26. The second actuation of callback key 26 is sensed by control program 34 which, in turn, causes base unit 12 to go off-hook, in a speakerphone mode and to dial the caller ID (step 60).

If the user decides not to immediately call the number indicated by the caller ID, the user merely waits for a period of seconds, e.g. 5 seconds, for a timeout to occur, at which point control program 34 causes message playback to continue from where it was interrupted (step 62).

At call completion, the user may release the speaker mode by pressing the speaker key 27, thus causing base unit 12 to go on-hook. During the call, the user being off-hook, can disable the speaker mode by pressing speaker key 27 and continue the conversation via handset 14. In such case when handset 14 is placed on-hook, the call is completed (step 64).

Once the user's telephone goes back on-hook, if the user presses message playback key 24 within M seconds (e.g. 5 seconds), message playback will continue from the point where it stopped (step 66). Otherwise, telephone system 10 is caused to default to the answer ready mode by control program 34 (step 68).

Returning to step 56, the user may commence message playback, in the known manner, from a remote telephone via the actuation of one or more keys on that remote telephone. If during playback, the user wishes to know the caller ID of the message that is currently being played, the user presses (for example) the asterisk key on the remote telephone. In response, the caller ID is announced to the user and playback of the message then resumes (step 58). The user is thereafter enabled to directly place the telephone call via the remote telephone.

In summary, the above-described invention enables automatic placement of a telephone call simply by actuation of a callback key during a recorded message playback. Further, even if the user is positioned at a remote telephone, the caller ID associated with a message being played back under remote control is enabled to allow the user to replace a call to the party who left the message.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for enabling a telephone to provide an automatic call-back to a caller telephone whose caller has left a recorded message, said method comprising the steps of:

recording said message from said caller in a first memory located in said telephone;

storing an identifier of said caller telephone in a second memory located in said telephone;

playing said recorded message left by said caller;

responding to entry of a call-back signal, in response to playing of said message, by announcing said identifier over a speaker located in said telephone; and placing a call to said caller telephone using said recalled identifier.

2. The method as recited in claim 1, wherein said step of recording comprises storing said identifier in association with said message.

3. The method as recited in claim 1, wherein said step of responding is commenced in response to entry of said call-back signal by a user, and comprises indicating the identifier of said caller telephone.

4. The method as recited in claim 3, wherein said responding comprises proceeding to said placing if a second entry of said call-back signal is sensed in a determined period after said indicating.

5. The method as recited in claim 4, wherein said responding comprises continuing message playback if a second entry of said call-back signal is not sensed in said determined period after said indicating.

6. The method as recited in claim 1, further comprising responding to an entered message playback signal in a determined period after completing the call, by continuing playback of said message.

7. A telephone having means for enabling an automatic call-back to a caller telephone whose caller has left a recorded message, said enabling means comprising:

means for recording said message from said caller;

means, separate from said means for recording, for storing an identifier of said caller telephone;

means for playing said message left by said caller;

means for responding to entry of a call-back signal, in response to said playing means playing said message, by announcing said identifier of said caller telephone over a speaker located in said telephone; and means for placing a call to said caller telephone through use of said identifier.

8. The telephone as recited in claim 7, wherein said means for recording stores said identifier in association with said message.

9. The telephone as recited in claim 7, wherein said responding means causes an indication to be provided of the identifier of the caller telephone in response to entry of said call-back signal by a user.

10. The telephone as recited in claim 9, wherein said placing means becomes operational if a second entry of said call-back signal is sensed in a determined period after said indication.

11. The telephone as recited in claim 10, wherein said responding means continues message playback if a second entry of said call-back signal is not sensed within said determined period after said indication.

12. The telephone as recited in claim 7, further comprising means, responsive to completion of the call by said placing means, for responding to an entered message playback signal within a determined period after said completion of the call, by continuing playback of said message.

* * * * *